United States Patent
Wolfe et al.

(10) Patent No.: US 10,370,549 B2
(45) Date of Patent: Aug. 6, 2019

(54) CATIONIC MODIFIED SELF-DISPERSING PIGMENT DISPERSIONS AND INKJET INKS THEREOF

(71) Applicant: E I DU PONT DE NEMOURS AND COMPANY, Wilmington, DE (US)

(72) Inventors: Michael Stephen Wolfe, Wilmington, DE (US); Michael J. Eiseman, Swarthmore, PA (US); Loretta L. Tam, Hockessin, DE (US); Cullen Kirkpatrick, Phoenixville, PA (US)

(73) Assignee: E I DU PONT DE NEMOURS AND COMPANY, Wilmington, DE (US)

(*) Notice: Subject to any disclaimer, the term of this patent is extended or adjusted under 35 U.S.C. 154(b) by 0 days.

(21) Appl. No.: 15/570,421

(22) PCT Filed: Apr. 27, 2016

(86) PCT No.: PCT/US2016/029428
§ 371 (c)(1),
(2) Date: Oct. 30, 2017

(87) PCT Pub. No.: WO2016/176242
PCT Pub. Date: Nov. 3, 2016

(65) Prior Publication Data
US 2018/0155560 A1 Jun. 7, 2018

Related U.S. Application Data

(60) Provisional application No. 62/154,913, filed on Apr. 30, 2015.

(51) Int. Cl.
| | | |
|---|---|---|
| *C09D 11/322* | (2014.01) | |
| *C09D 11/324* | (2014.01) | |
| *C09D 11/38* | (2014.01) | |
| *C09D 17/00* | (2006.01) | |

(52) U.S. Cl.
CPC .......... *C09D 11/322* (2013.01); *C09D 11/324* (2013.01); *C09D 11/38* (2013.01); *C09D 17/001* (2013.01); *C09D 17/003* (2013.01); *C09D 17/005* (2013.01)

(58) Field of Classification Search
CPC .............................. C09D 11/30; C09D 11/322
See application file for complete search history.

(56) References Cited

U.S. PATENT DOCUMENTS

| | | | |
|---|---|---|---|
| 5,554,739 | A | 9/1996 | Belmont |
| 6,153,001 | A | 11/2000 | Suzuki et al. |
| 6,277,183 | B1 | 8/2001 | Johnson et al. |
| 6,332,919 | B2 | 12/2001 | Osumi et al. |
| 6,375,317 | B1 | 4/2002 | Osumi et al. |
| 6,852,156 | B2 | 2/2005 | Yeh et al. |
| 6,899,754 | B2 | 5/2005 | Yeh et al. |
| 2002/0075369 | A1 | 6/2002 | Ota et al. |
| 2004/0035319 | A1* | 2/2004 | Yeh ....................... C09D 11/322 106/31.6 |
| 2005/0274281 | A1 | 12/2005 | Jackson |
| 2009/0020035 | A1* | 1/2009 | Jackson ............... C09D 11/322 106/31.9 |
| 2012/0075369 | A1 | 3/2012 | Anton et al. |

FOREIGN PATENT DOCUMENTS

| | | |
|---|---|---|
| EP | 1086997 A2 | 3/2001 |
| EP | 2354196 A1 | 8/2011 |
| WO | 2003/104340 A1 | 12/2003 |
| WO | 2010/088589 A1 | 8/2010 |

OTHER PUBLICATIONS

PCT International Search Report for Application No. PCT/US2016/029428; Haider, Ursula, Authorized Officer; ISA/EPO; dated Jun. 23, 2016.

\* cited by examiner

*Primary Examiner* — Veronica F Faison
(74) *Attorney, Agent, or Firm* — Simon L. Xu

(57) ABSTRACT

This invention pertains to aqueous inkjet inks containing self-dispersing pigments. The self-dispersing pigments are modified with multivalent cations.

18 Claims, No Drawings

CATIONIC MODIFIED SELF-DISPERSING PIGMENT DISPERSIONS AND INKJET INKS THEREOF

This application claims priority under 35 U.S.C. § 119 from U.S. Provisional Application Ser. No. 62/154,913, filed Apr. 30, 2015.

BACKGROUND OF THE INVENTION

This invention pertains to inkjet inks, in particular to inkjet inks made from a self-dispersing pigment modified to include a multivalent cation.

Inkjet printing is a non-impact printing process in which droplets of ink are deposited on a substrate, such as paper, to form the desired image. Inkjet printers are equipped with an ink set which, for full color printing, typically comprises a cyan, magenta and yellow ink (CMY). An ink set also commonly comprises a black ink (CMYK).

Pigments suitable for aqueous inkjet inks are in general well-known in the art. Typically, pigments are stabilized by dispersing agents, such as polymeric dispersants or surfactants, to produce a stable dispersion of the pigment in the vehicle. The pigment can also be "self-dispersible" or a "self-dispersing" pigments (hereafter "SDP(s)").

U.S. Pat. No. 6,899,754 discloses an inkjet ink containing an SDP and a multivalent cation. The multivalent cation is added at the ink formulation stage rather than during the preparation of the SDP dispersion.

U.S. Pat. No. 6,332,919 and EP-A-1086997 disclose a black inkjet ink comprising an SDP and salts of monovalent cations. It is suggested that the presence of these monovalent salts improves optical density at a given pigment loading.

U.S. Pat. No. 6,277,183 discloses a black inkjet ink comprising an SDP ink and a metal oxide, where optical density of the ink is higher when metal oxide is present than when it is absent.

U.S. Pat. No. 6,153,001 discloses an example of a black inkjet ink containing an SDP (Microjet® CW1) and 9 ppm calcium. No information is provided on the source or physical state of the calcium or on the nature of the SDP. No suggestion is made of any optical density relationship.

U.S. Pat. No. 6,375,317 discloses an inkjet ink comprising an SDP and calcium hydroxide in an aqueous medium.

A need still exists for inkjet ink formulations that provide good printing quality. The present disclosure satisfies this need by providing compositions having improved bleed property and better optical density (OD).

SUMMARY OF THE INVENTION

An embodiment provides an aqueous pigment dispersion comprising:

a self-dispersing pigment having at least one type of hydrophilic functional group bonded onto a surface of the self-dispersing pigment, said at least one type of hydrophilic functional group comprising a carboxyl group; and a multivalent cation selected from the group consisting of $Mg^{2+}$, $Ca^{2+}$, $Cu^{2+}$, $Al^{3+}$, $Fe^{3+}$, and mixtures thereof, wherein said cation is adsorbed onto said self-dispersing pigment via ionic bonds between the cation and surface acid group on the self-dispersing pigment.

Another embodiment provides a process for making an aqueous inkjet ink comprising the step of:

(a) preparing an aqueous vehicle; and (b) adding the aqueous vehicle to an aqueous pigment dispersion, wherein said pigment dispersion comprising a self-dispersing pigment having at least one type of hydrophilic functional group bonded onto a surface of said self-dispersing pigment, said at least one type of hydrophilic functional group comprising a carboxyl group; and a multivalent cation selected from the group consisting of $Mg^{2+}$, $Ca^{2+}$, $Cu^{2+}$, $Al^{3+}$, $Fe^{3+}$, and mixtures thereof, wherein said cation is adsorbed onto said self-dispersing pigment via ionic bonds between the cation and surface acid group on said self-dispersing pigment.

Another embodiment provides an aqueous inkjet ink prepared by a process comprising the steps of:

(a) preparing an aqueous vehicle; and (b) adding the aqueous vehicle to an aqueous pigment dispersion, wherein said pigment dispersion comprising a self-dispersing pigment having at least one type of hydrophilic functional group bonded onto a surface of said self-dispersing pigment, said at least one type of hydrophilic functional group comprising a carboxyl group; and a multivalent cation selected from the group consisting of $Mg^{2+}$, $Ca^{2+}$, $Cu^{2+}$, $Al^{3+}$, $Fe^{3+}$, and mixtures thereof, wherein said cation is adsorbed onto said self-dispersing pigment via ionic bonds between the cation and surface acid group on said self-dispersing pigment.

Another embodiment provides an inkjet ink comprising an aqueous vehicle and an aqueous pigment dispersion, wherein said pigment dispersion comprising a self-dispersing pigment having at least one type of hydrophilic functional group bonded onto a surface of the self-dispersing pigment, said at least one type of hydrophilic functional group comprising a carboxyl group; and a multivalent cation selected from the group consisting of $Mg^{2+}$, $Ca^{2+}$, $Cu^{2+}$, $Al^{3+}$, $Fe^{3+}$, and mixtures thereof, wherein said cation is adsorbed onto said self-dispersing pigment via ionic bonds between the cation and surface acid group on the self-dispersing pigment.

Another embodiment provides that the multivalent cation is present at a level of at least 2 ppm.

Another embodiment provides that the multivalent cation is $Mg^{2+}$.

Another embodiment provides that the multivalent cation is $Cu^{2+}$.

Another embodiment provides that the multivalent cation is $Ca^{2+}$.

Yet another embodiment provides that the multivalent cation is $Al^{3+}$.

These and other features and advantages of the present embodiments will be more readily understood by those of ordinary skill in the art from a reading of the following Detailed Description. Certain features of the disclosed embodiments which are, for clarity, described above and below as separate embodiments, may also be provided in combination in a single embodiment. Conversely, various features of the disclosed embodiments that are described in the context of a single embodiment, may also be provided separately or in any subcombination.

DETAILED DESCRIPTION

Unless otherwise stated or defined, all technical and scientific terms used herein have commonly understood meanings by one of ordinary skill in the art to which this disclosure pertains.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

When the term "about" is used in describing a value or an end-point of a range, the disclosure should be understood to include the specific value or end-point referred to.

As used herein, the term "SDP" means a "self-dispersible" or "self-dispersing" pigment.

As used herein, the term "dispersion" means a two phase system wherein one phase consists of finely divided particles (often in a colloidal size range) distributed throughout a bulk substance, the particles being the dispersed or internal phase and the bulk substance being the continuous or external phase.

As used herein, the term "dispersant" means a surface active agent added to a suspending medium to promote uniform and maximum separation of extremely fine solid particles often of colloidal sizes. For pigments, the dispersants are most often polymeric dispersants, and the dispersants and pigments are usually combined using a dispersing equipment.

As used herein, the term "OD" means optical density.

As used herein, the term "degree of functionalization" refers to the amount of hydrophilic groups present on the surface of the SDP per unit surface area, measured in accordance with the method described further herein.

As used herein, the term "aqueous vehicle" refers to water or a mixture of water and at least one water-soluble, or partially water-soluble (i.e., methyl ethyl ketone), organic solvent (co-solvent).

As used herein, the term "D50" means the volume particle diameter of the 50th percentile (median) of the distribution of particle sizes.

As used herein, the term "substantially" means being of considerable degree, almost all.

As used herein, the term "dyne/cm" means dyne per centimeter, a surface tension unit.

As used herein, the term "cP" means centipoise, a viscosity unit.

As used herein, the term "mPa·s" means millipascal second, a viscosity unit.

As used herein, the term "mN·m$^{-1}$" means milliNewtons per meter, a surface tension unit.

As used herein, the term "mS·cm$^{-1}$" means milliSiemens per centimeter, a conductivity unit.

As used herein, the term "EDTA" means ethylenediaminetetraacetic acid.

As used herein, the term "IDA" means iminodiacetic acid.

As used herein, the term "EDDHA" means ethylenediamine-di(o-hydroxyphenylacetic acid).

As used herein, the term "DHEG" means dihydroxyethylglycine.

As used herein, the term "DTPA" means diethylenetriamine-N,N,N',N",N"-pentaacetic acid.

As used herein, the term "GEDTA" means glycoletherdiamine-N,N,N',N'-tetraacetic acid.

As used herein, Surfynol® 465 is a surfactant from Air Products (Allentown, Pa., U.S.A.).

As used herein, the term "2P" means 2-Pyrrolidone.

As used herein, the term "RMSD" refers to root mean square deviation.

As used herein, the term "jettability" means good jetting properties with no clogging or deflection during printing.

As used herein, the term "persistence length" is a basic mechanical property quantifying the stiffness of a long polymer.

Unless otherwise noted, the above chemicals were obtained from Aldrich (Milwaukee, Wis., U.S.A.) or other similar suppliers of laboratory chemicals.

The materials, methods, and examples herein are illustrative only except as explicitly stated, and are not intended to be limiting.

In addition, references in the singular may also include the plural (for example, "a" and "an" may refer to one, or one or more) unless the context specifically states otherwise.

Aqueous Vehicle

Selection of a suitable aqueous vehicle mixture depends on requirements of the specific application, such as the desired surface tension and viscosity, the selected colorant, drying time of the ink, and the type of substrate onto which the ink will be printed. Representative examples of water-soluble organic solvents which may be utilized in the present disclosure are those that are disclosed in U.S. Pat. No. 5,085,698.

If a mixture of water and a water-soluble solvent is used, the aqueous vehicle typically will contain about 30% to about 95% of water with the remaining balance (i.e., about 70% to about 5%) being the water-soluble solvent. Compositions of the present disclosure may contain about 60% to about 95% water, based on the total weight of the aqueous vehicle.

The amount of aqueous vehicle in the ink is typically in the range of about 70% to about 99.8%; specifically about 80% to about 99.8%, based on total weight of the ink.

The aqueous vehicle can be made to be fast penetrating (rapid drying) by including surfactants or penetrating agents such as glycol ether(s) or 1,2-alkanediols. Suitable surfactants include ethoxylated acetylene diols (e.g., Surfynols® series from Air Products), ethoxylated primary (e.g., Neodol® series from Shell) and secondary (e.g., Tergitol® series from Union Carbide) alcohols, sulfosuccinates (e.g., Aerosol® series from Cytec), organosilicones (e.g., Silwet® series from Witco) and fluoro surfactants (e.g., Zonyl® series from DuPont).

The amount of glycol ether(s) or 1,2-alkanediol(s) added must be properly determined, but is typically in a range of from about 1% to about 15% by weight, and more typically about 2% to about 10% by weight, based on the total weight of the ink. Surfactants may be used, typically in an amount of from about 0.01% to about 5%, and specifically from about 0.2% to about 2%, based on the total weight of the ink.

Pigments

The SDPs of the present disclosure may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle. The hydrophilic groups are carboxylate or sulfonate groups which provide the SDP with a negative charge when dispersed in aqueous vehicle. The carboxylate or sulfonate groups are usually associated with monovalent and/or divalent cationic counter-ions. Methods of making SDPs are well known and can be found, for example, in U.S. Pat. Nos. 5,554,739 and 6,852,156.

The SDPs may be black, such as those based on carbon black, or may be colored pigments. Examples of pigments with coloristic properties useful in inkjet inks include: Pigment Blue 15:3 and Pigment Blue 15:4 (for cyan);

Pigment Red 122 and Pigment Red 202 (for magenta); Pigment Yellow 14, Pigment Yellow 74, Pigment Yellow 95, Pigment Yellow 110, Pigment Yellow 114, Pigment Yellow 128 and Pigment Yellow 155 (for yellow); Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264 (for red); Pigment Green 1, Pigment Green 2, Pigment Green 7 and Pigment Green 36264 (for green); Pigment Blue 60, Pigment Violet 3, Pigment Violet 19, Pigment Violet 23, Pigment Violet 32, Pigment Violet 36 and Pigment Violet 38 (for blue); and carbon black. However, some of these pigments may not be suitable for preparation as SDP. Colorants are referred to herein by their "C.I.".

The SDPs of the present disclosure may have a degree of functionalization wherein the density of anionic groups is less than about 3.5 µmoles per square meter of pigment surface (3.5 µmol/m$^2$), and more specifically, less than about 3.0 µmol/m$^2$. Degrees of functionalization of less than about 1.8 µmol/m$^2$, and more specifically, less than about 1.5 µmol/m$^2$, are also suitable and may be preferred for certain specific types of SDPs.

The range of useful particle size after dispersion is typically from about 0.005 micrometers to about 15 micrometers. Typically, the pigment particle size should range from about 0.005 micrometers to about 5 micrometers; and, specifically, from about 0.005 micrometers to about 1 micrometers. The average particle size as measured by dynamic light scattering is less than about 500 nm, typically less than about 300 nm.

The amount of pigment present in the ink is typically in the range of from about 0.1% to about 25% by weight, and more typically in the range of from about 0.5% to about 10% by weight, based on the total weight of ink. If an inorganic pigment is selected, the ink will tend to contain higher percentages by weight of pigment than with comparable inks employing organic pigment, since inorganic pigments generally have higher densities than organic pigments.

Multivalent Cation

The self-dispersing pigment dispersion of the present disclosure comprises one or more multivalent cations. The effective amounts needed in a particular situation can vary, and some adjustment, as provided for herein, will generally be necessary.

"Multivalent" indicates an oxidation state of two or more and, for an element "Z", are typically described as $Z^{2+}$, $Z^{3+}$, $Z^{4+}$ and so forth. For brevity, multivalent cations may be referred to herein as $Z^x$. The multivalent cations are preferably soluble in the aqueous ink vehicle and preferably exist in a substantially ionized state. The multivalent cations should be in a form where they are free and available to interact with ink components, in particular the SDP. A multivalent cation in unavailable form, for example $Z^x$ tightly bound as a refractory oxide, is not considered a multivalent cation for the purposes of this invention.

$Z^x$ includes, but is not limited to multivalent cations of the following elements: Mg, Ca, Sr, Ba, Sc, Y, La, Ti, Zr, V, Cr, Mn, Fe, Ru, Co, Rh, Ni, Pd, Pt, Cu, Au, Zn, Al, Ga, In, Sb, Bi, Ge, Sn, Pb. In one embodiment, the multivalent cation is not Ca. In another embodiment, the multivalent cation comprises at least one of Ca, Ba, Ru, Co, Zn and Ga. In yet another embodiment, the multivalent cation comprises at least one of Ba, Ru, Co, Zn and Ga. In a preferred embodiment, $Z^x$ comprises a trivalent cation.

$Z^x$ can be incorporated into ink by addition in a salt form or by addition in an alkaline form and used as a base in the adjustment of the ink pH. As with any dispersion, especially one that is ionically stabilized, the presence of large amounts of $Z^x$ can be destabilizing. The effective levels of $Z^x$ needed for the instant inks are below that which causes instability or other problems.

There is no particular lower limit of $Z^x$, although minimum levels contemplated by the instant invention are levels greater than trace or incidental amounts. Generally, there is at least about 2 ppm, commonly at least about 4 ppm, and even 10 ppm or more of multivalent in the ink. Likewise, there is no particular upper limit except as dictated by stability or other ink properties. At some level, though, there is no additional OD gain with increasing $Z^x$. In some cases, too much $Z^x$ may cause the OD to decrease again. In general, beneficial effects are achieved with less than about 200 ppm of $Z^x$, and typically even less than about 100 ppm.

Although the preceding discussion of $Z^x$ in terms of weight percent is provided for the sake of simple, concrete guidance, it will be appreciated from the examples herein after that the appropriate levels of multivalent cations are related in a more complex way to factors such as molar equivalents, atomic weight, valence state; and also, to the amount SDP in the ink and its level of treatment.

Thus a preferred method for considering multivalent cation content is by adjusted equivalents of $Z^x$ per 100 equivalents of surface function. The amount of Z present is adjusted (multiplied by) the valence state (x). An equation can be written as follows:

$$\text{Adjusted } Z \text{ per 100 surface function} = \frac{100 \text{ (equivalents } Z)(x)}{\text{equiv. of surface funct.}}$$

When $Z^x$ comprises more than one species of multivalent cation, the adjusted Z per 100 surface function is the sum of adjusted Z for all $Z^x$ species present. Preferred levels of adjusted Z per 100 surface function range between about 0.5 to 20, and more preferably between about 0.8 to 12.

Due to potential problems with kogation in thermo inkjet printheads associated with soluble multivalent cations, selection of cation is critical. A suitable cation is one that can strongly adsorb onto SDP pigment acid functionality. $Al^{3+}$, $Fe^{3+}$, $Mg^{2+}$, $Cu^{2+}$ and $Ca^{2+}$ are particularly suitable for the dispersions of the present disclosure, although other multivalent cations may also be used.

Addition of multivalent cations to SDP by methods described in U.S. Pat. No. 6,899,754 limits the level of cations that can be added because the ionic strength will become too high. A high level of multivalent cations can be introduced to the dispersion by removing ionic strength from monovalent cations and anions.

Water soluble multivalent cation salts are added directly to a pigment dispersion. Adjustment of pH during the addition of cation salts may be necessary to maintain alkalinity. The addition of cation salts is typically followed by ultrafiltration in order to lower the ionic strength so as to improve dispersion stability. Otherwise, the resulting dispersion may exhibit particle size growth due to dispersion shocking during the addition of salts. Microfluidization or other high shear processing may be required to break up the aggregates. Alternatively, by maintaining a conductivity target of the concentrate during ultrafiltration, it is possible to achieve a specific multivalent cation mole ratio with respect to surface acid functionality while controlling particle size growth.

The dispersions of the present disclosure can also be made by introducing the multivalent cations as water soluble salts or water insoluble hydroxides during the SDP oxidation process, such as the ones described in U.S. Pat. No. 6,852,156, which is incorporated by reference herein as if fully set forth. The hydroxides thus introduced can be solubilized due to acids generated during the oxidation process.

Other Additives

Other ingredients, additives, may be formulated into the inkjet ink, to the extent that such other ingredients do not interfere with the stability and jettability of the inkjet ink. This may be readily determined by routine experimentation by one skilled in the art.

Surfactants are commonly added to inks to adjust surface tension and wetting properties. Suitable surfactants include the ones disclosed in the Vehicle section above. Surfactants are typically used in amounts up to about 5% and more typically in amounts up to 2% by weight, based on the total weight of the ink.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), diethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Polymers may be added to the ink to improve durability or other properties. The polymers can be soluble in the vehicle or in a dispersed form, and can be ionic or nonionic. Soluble polymers include linear homopolymers and copolymers or block polymers. They also can be structured polymers including graft or branched polymers, stars and dendrimers. The dispersed polymers may include, for example, latexes and hydrosols. The polymers may be made by any known process including, but not limited to, free radical, group transfer, ionic, condensation and other types of polymerization. They may be made by a solution, emulsion, or suspension polymerization process. Typical classes of polymer additives include anionic acrylic, styrene-acrylic and polyurethane polymer.

When a polymer is present, its level is typically between about 0.01% and about 3% by weight, based on the total weight of an ink. The upper limit is dictated by ink viscosity or other physical limitations.

Ink Sets

The term "ink set" refers to all the individual inks or other fluids an inkjet printer is equipped to jet. Ink sets typically comprise at least three differently colored inks. For example, a cyan (C), magenta (M) and yellow (Y) ink forms a CMY ink set. More typically, an ink set includes at least four differently colored inks, for example, by adding a black (K) ink to the CMY ink set to form a CMYK ink set. The magenta, yellow and cyan inks of the ink set are typically aqueous inks, and may contain dyes, pigments or combinations thereof as the colorant. Such other inks are, in a general sense, well known to those of ordinary skill in the art.

In addition to the typical CMYK inks, an ink set may further comprise one or more "gamut-expanding" inks, including differently colored inks such as an orange ink, a green ink, a red ink and/or a blue ink, and combinations of full strength and light strength inks such as light cyan and light magenta. Such other inks are, in a general sense, known to one skilled in the art.

A typical ink set comprises a magenta, yellow, cyan and black ink, wherein the black ink is an ink according to the present disclosure comprising an aqueous vehicle and a self-dispersing carbon black pigment. Specifically, the colorant in each of the magenta, yellow and cyan inks is a dye.

Ink Properties

Jet velocity, separation length of the droplets, drop size and stream stability are greatly affected by the surface tension and the viscosity of the ink. Pigmented ink jet inks typically have a surface tension in the range of about 20 dyne/cm to about 70 dyne/cm at 25° C. Viscosity can be as high as 30 cP at 25° C., but is typically somewhat lower. The ink has physical properties compatible with a wide range of ejecting conditions, i.e., driving frequency of the piezo element or ejection conditions for a thermal head for either a drop-on-demand device or a continuous device, and the shape and size of the nozzle. The inks should have excellent storage stability for long periods so as not to clog to a significant extent in an ink jet apparatus. Furthermore, the ink should not corrode parts of the ink jet printing device it comes in contact with, and it should be essentially odorless and non-toxic.

Although not restricted to any particular viscosity range or printhead, the inventive ink set is particularly suited to lower viscosity applications such as those required by thermal printheads. Thus the viscosity of the inventive inks at 25° C. can be less than about 7 cP, typically less than about 5 cP, and more typically than about 3.5 cP. Thermal inkjet actuators rely on instantaneous heating/bubble formation to eject ink drops and this mechanism of drop formation generally requires inks of lower viscosity.

Substrate

The present embodiments are particularly advantageous for printing on plain paper, such as common electrophotographic copier paper and photo paper, glossy paper and similar papers used in inkjet printers.

EXAMPLES

Calculation of Acid Value

The acid value was calculated as shown below.

$$\text{Acid Value} = (V_2 - V_1) * (\text{HCl Normality}) / (\text{Sample Wt.} * \% \text{ Solids of sample})$$

Units for Acid Value is "mmols of acid per g solid"
Where:
  $V_1$=Volume (mL) at Inflection Pt. #1
  $V_2$=Volume (mL) at Inflection Pt. #2
  HCl Normality=Normality of the HCl titrant solution used in titration
  Sample Wt.=Weight (g) of the aqueous SDP
  % Solids=Percent solids of acid-containing pigment dispersion Pigment Dispersion 1

Carbon Black (Nipex 160 IQ, Orion, surface area=180, Oil Absorption=128, primary particle size=20 nm) was oxidized according to the procedure described in U.S. Pat. No. 6,852,156 until the desired level of surface functionalization was achieved, and subsequently neutralized with potassium hydroxide.

After oxidation and neutralization, the dispersion was purified by ultrafiltration. The acid value of the dispersion was measured by adjusting the pH of a weighed sample of the dispersion to ~12 to ensure all acid groups on the surface are neutralized. The sample was then back titrated with dilute hydrochloric acid using an auto titrator. Pigment Dispersion 1 thus obtained had a solid content of 19.45% and an acid value of 0.19 mmol/g.

Pigment Dispersion 2

Carbon Black (Nipex 160 IQ) was prepared identically as described in Pigment Dispersion 1. However, during the neutralization step, calcium hydroxide was added at an amount needed to neutralize 50% of the acid groups on the surface, or 0.5 mol Ca(OH)$_2$ per mol of acid. Potassium hydroxide was used to neutralize the remaining acid groups. The resulting dispersion was purified similar to Pigment Dispersion 1.

Pigment Dispersion 3

Carbon Black (Nipex 160 IQ) was prepared identically as described in Pigment Dispersion 1. However, during the neutralization step, magnesium hydroxide was added at an amount needed to neutralize 50% of the acid groups on the surface, or 0.5 mol Mg(OH)$_2$ per mol of acid. Potassium hydroxide was used to neutralize the remaining acid groups. The resulting dispersion was purified similar to Pigment Dispersion 1.

Pigment Dispersion 4

Using a sample of Pigment Dispersion 1, the sample was added to a pot and diluted with DI water to 4% pigment. The bottom discharge of the pot was pumped to a 500 kilodalton ultrafiltration membrane cartridge and recirculated. Separately, a 0.04 M solution of calcium nitrate was prepared and loaded into an addition funnel. The amount of solution prepared was such that the molar ratio of Ca(NO$_3$)$_2$ to pigment surface acid was 0.4. The addition funnel was mounted above the concentrate pot and added dropwise, while permeate was collected in a separate pot. The calcium displaces the potassium salt on the pigment. The potassium and nitrate are removed from the concentrate in the permeate. The concentrate pot was held at ~4% pigment and washed with DI water to a conductivity end point of ~0.1 mS/cm following addition of the salt solution. The dispersion was then concentrated to ~12% pigment.

Pigment Dispersion 5

Using a sample of Pigment Dispersion 1, the sample was added to a pot and diluted with DI water to 4% pigment. The bottom discharge of the pot was pumped to a 500 kilodalton ultrafiltration membrane cartridge and recirculated. Separately, a 0.04 M solution of magnesium nitrate was prepared and loaded into an addition funnel. The amount of solution prepared was such that the molar ratio of Mg(NO$_3$)$_2$ to pigment surface acid was 0.4. The addition funnel was mounted above the concentrate pot and added dropwise, while permeate was collected in a separate pot. The magnesium displaces the potassium salt on the pigment. The potassium and nitrate are removed from the concentrate in the permeate. The concentrate pot was held at ~4% pigment and washed with DI water to a conductivity end point of ~0.1 mS/cm following addition of the salt solution. The dispersion was then concentrated to ~12% pigment.

Pigment Dispersion 6

Using a sample of Pigment Dispersion 1, the sample was added to a pot and diluted with DI water to 4% pigment. The bottom discharge of the pot was pumped to a 500 kilodalton ultrafiltration membrane cartridge and recirculated. Separately, a 0.04 M solution of aluminum nitrate was prepared and loaded into an addition funnel. The amount of solution prepared was such that the molar ratio of Al(NO$_3$)$_3$ to pigment surface acid was 0.4. The addition funnel was mounted above the concentrate pot and added dropwise, while permeate was collected in a separate pot. The aluminum displaces the potassium salt on the pigment. The potassium and nitrate are removed from the concentrate in the permeate. The concentrate pot was held at ~4% pigment and washed with DI water to a conductivity end point of ~0.1 mS/cm following addition of the salt solution. The dispersion was then concentrated to ~12% pigment.

Pigment Dispersion 7

Using a sample of Pigment Dispersion 1, the sample was added to a pot and diluted with DI water to 4% pigment. The bottom discharge of the pot was pumped to a 500 kilodalton ultrafiltration membrane cartridge and recirculated. Separately, a 0.04 M solution of copper nitrate was prepared and loaded into an addition funnel. The amount of solution prepared was such that the molar ratio of Cu(NO$_3$)$_2$ to pigment surface acid was 0.4. The addition funnel was mounted above the concentrate pot and added dropwise, while permeate was collected in a separate pot. The copper displaces the potassium salt on the pigment. The potassium and nitrate are removed from the concentrate in the permeate. The concentrate pot was held at ~4% pigment and washed with DI water to a conductivity end point of ~0.1 mS/cm following addition of the salt solution. The dispersion was then concentrated to ~12% pigment.

Results

The amount of multivalent cation adsorbed to the surface of the pigment was measured by Inductively Coupled Plasma (ICP) elemental analysis. The concentration of the cation is listed in Table 1 below.

TABLE 1

| Dispersion No. | % Pigment | Multivalent Cation | Concentration (ppm) |
| --- | --- | --- | --- |
| 1 (Control) | 19.45 | — | — |
| 2 | 12.43 | Ca$^{+2}$ | 442 |
| 3 | 11.68 | Mg$^{+2}$ | 265 |
| 4 | 12.74 | Ca$^{+2}$ | 373 |
| 5 | 11.90 | Mg$^{+2}$ | 214 |
| 6 | 12.28 | Al$^{+3}$ | 251 |
| 7 | 12.97 | Cu$^{+2}$ | 675 |

Inks 1A-7A were prepared using Dispersions 1-7 and ingredients listed in Table 2 below. The pigment weight percent of each ink was 6.0%. Ink vehicle ingredients were added to water with stirring in the sequence as shown in Table 2. The ink vehicle thus obtained was then added to the pigment dispersion with stirring. The final pH was adjusted, if needed, to the range of 8.0 to 8.5 with dilute KOH.

TABLE 2

| Ingredients | Weight % |
| --- | --- |
| SDP Dispersion | 6.0 (Pigment Solids) |
| Glycerol | 7.0 |
| 2P | 5.0 |
| Triethylene Glycol | 7.0 |
| 1,2-propanediol | 1.0 |
| Surfynol ®465 | 0.3 |
| Proxel ® GXL | 0.2 |
| Water | Balance to 100% |

Physical properties of the final inks were measured and recorded. Each sample was aged in an oven for seven days at 70° C. and the physical properties indicative of stability were re-measured. Inks having less than 10% of change in particle size after the aging test are considered stable.

TABLE 3

| Ink | mol Cation/ mol Acid | Surface Tension dynes/ cm | Viscosity cps @ 25° C. | D50, nm Initial | D50, nm After Aging | % Pass at 204.4 nm Initial | % Pass at 204.4 nm After Aging |
|---|---|---|---|---|---|---|---|
| 1A (control) | — | 39.9 | 2.7 | 113.7 | 118.3 | 98.50% | 97.50% |
| 2A | 0.5 | 39 | 2.7 | 110.4 | 113.7 | 93.70% | 98.20% |
| 3A | 0.5 | 39.3 | 2.7 | 119.3 | 121.1 | 98.60% | 98.40% |
| 4A | 0.4 | 40.2 | 2.8 | 124.5 | 123.2 | 97.90% | 96.60% |
| 5A | 0.4 | 39.8 | 2.8 | 114.8 | 123 | 96.20% | 98.20% |
| 6A | 0.4 | 40.7 | 3.3 | 140.4 | 139.5 | 92.50% | 91.00% |
| 7A | 0.4 | 40 | 3 | 127.7 | 128.3 | 97.10% | 93.90% |

The following experiments were conducted to demonstrate the process advantages of surface treating of pigment surfaces with multivalent cations during the dispersion preparation process instead of free adding of cations during the preparation of inks. Free adding the multivalent cations during the preparation of inks limits the amount of surface treatment that can take place before the ink becomes unstable. If addition is made either during ozonation or purification, it is possible to achieve a stable ink with higher concentrations of multivalent cations. This becomes evident when comparing results of Table 3 and Table 4.

To prepare comparative inks where cations are added during ink preparation, 0.02 molar solutions of $Ca(NO_3)_2$, $Mg(NO_3)_2$, $Al(NO_3)_3$ and $Cu(NO_3)_2$ were prepared separately. Next, seven inks (Inks 1B-7B) were made, similar to those listed in Table 3, but all using the control, Pigment Dispersion 1, and the respective 0.02 molar solutions of $Ca(NO_3)_2$, $Mg(NO_3)_2$, $Al(NO_3)_3$ and $Cu(NO_3)_2$, targeting the mol Cation/mol Acid ratios and listed in Table 4 and normalized to 6% pigment by weight.

Initial physical properties were measured and samples submitted for elemental analysis by Inductively Coupled Plasma (ICP). Results are presented in Table 4.

TABLE 4

| Inks | Treatment (Added to Ink) | mol Cation/ mol Acid | Surface Tension dynes/ cm | Viscosity cps @ 25° C. | D50, nm Initial | % Pass at 204.4 nm Initial |
|---|---|---|---|---|---|---|
| 1B | Control | — | 40.37 | 2.7 | 115.5 | 98.4% |
| 2B | $Ca(NO_3)_2$ | 0.5 | 43.69 | 350 | 153.0 | 86.3% |
| 3B | $Mg(NO_3)_2$ | 0.5 | 42.51 | 410 | 152.7 | 88.3% |
| 4B | $Ca(NO_3)_2$ | 0.4 | 39.66 | 14.1 | 154.3 | 83.7% |
| 5B | $Mg(NO_3)_2$ | 0.4 | 39.15 | 6.6 | 142.1 | 88.3% |
| 6B | $Al(NO_3)_3$ | 0.4 | 41.62 | 100.0 | 198.4 | 53.9% |
| 7B | $Cu(NO_3)_2$ | 0.4 | 40.54 | 4.67 | 144.4 | 94.1% |

In most cases, there was a visible destabilization when the multivalent cation solutions were added to the inks. As shown in Table 4, both viscosity and particle size increased significantly compared to the control Ink 1B. Based on these initial physical properties, the inks were deemed unstable, and an accelerated stability test, oven aging, was not required.

Print Test

Inks 1A-7A were loaded into a model QY6-0073 ink jet print head manufactured by Canon for use in the PIXMA MX870 printer. The inks were jetted in single pass mode onto plain papers, including Xerox (X4200) and Staples (Stap92) paper. The inks were also jetted onto Hewlett-Packard Multipurpose Paper (HPMP) with ColorLok®, which has a multivalent cationic treatment that increases the OD of the printed image.

For each paper type, an image/target was printed on two separate sheets. The optical density (OD) was measured in three separate areas of each print and averaged (six measurements) for the final reported reading. Results are reported in Table 4.

TABLE 5

| Ink | MOL CATION/ MOL ACID | % PIGMENT | AVERAGE OPTICAL DENSITY X4200 | AVERAGE OPTICAL DENSITY HPMP | AVERAGE OPTICAL DENSITY Stap92 |
|---|---|---|---|---|---|
| 1A (Control) | — | 6 | 1.36 | 1.49 | 1.35 |
| 2A | 0.5 | 6 | 1.41 | 1.52 | 1.39 |
| 3A | 0.5 | 6 | 1.46 | 1.51 | 1.44 |
| 4A | 0.4 | 6 | 1.53 | 1.53 | 1.49 |
| 5A | 0.4 | 6 | 1.48 | 1.49 | 1.43 |
| 6A | 0.4 | 6 | 1.44 | 1.55 | 1.39 |
| 7A | 0.4 | 6 | 1.44 | 1.49 | 1.43 |

As shown in Table 5, there was a significant increase in OD on plain paper. The OD on HPMP paper was not as significant, but this was expected since there were already multivalent cations present on this type of paper. The goal was to achieve similar OD results on plain paper, as one would expect on paper treated with a fixer or multivalent cations.

What is claimed is:

1. An aqueous pigment dispersion comprising:
   a self-dispersing pigment having at least one type of hydrophilic functional group bonded onto a surface of the self-dispersing pigment, said at least one type of hydrophilic functional group comprising a carboxyl group; and
   a multivalent cation selected from the group consisting of $Mg^{2+}$, $Ca^{2+}$, $Cu^{2+}$, $Al^{3+}$, $Fe^{3+}$, and mixtures thereof, wherein said multivalent cation is adsorbed onto said self-dispersing pigment via ionic bonds between the multivalent cation and surface acid group on the self-dispersing pigment displacing monovalent cation(s) associating with the carboxyl group on the surface of the self-dispersing pigment, the displaced monovalent cation(s) are removed from the pigment dispersion.

2. The pigment dispersion of claim 1, wherein said multivalent cation is present at a level of at least 2 ppm.

3. The pigment dispersion of claim 1, wherein said multivalent cation is $Mg^{2+}$.

4. The pigment dispersion of claim 1, wherein said multivalent cation is $Cu^{2+}$.

5. The pigment dispersion of claim 1, wherein said multivalent cation is $Ca^{2+}$.

6. The pigment dispersion of claim 1, wherein said multivalent cation is $Al^{3+}$.

7. A process for making an aqueous inkjet ink comprising the step of:
   (a) preparing an aqueous vehicle;
   (b) adding the aqueous vehicle to an aqueous pigment dispersion, wherein said pigment dispersion comprising a self-dispersing pigment having at least one type of hydrophilic functional group bonded onto a surface of said self-dispersing pigment, said at least one type of hydrophilic functional group comprising a carboxyl group; and a multivalent cation selected from the group consisting of $Mg^{2+}$, $Ca^{2+}$, $Cu^{2+}$, $Al^{3+}$, $Fe^{3+}$, and mixtures thereof, wherein said cation is adsorbed onto said self-dispersing pigment via ionic bonds between the cation and surface acid group on said self-dispersing pigment displacing monovalent cation(s) associating with the carboxyl group on the surface of the self-dispersing pigment; and (c) removing the monovalent cation(s) displaced by the multivalent cation.

8. The process of claim 7, wherein said multivalent cation is present at a level of at least 2 ppm.

9. The process of claim 7, wherein said multivalent cation is $Mg^{2+}$.

10. The process of claim 7, wherein said multivalent cation is $Cu^{2+}$.

11. The process of claim 7, wherein said multivalent cation is $Ca^{2+}$.

12. The process of claim 7, wherein said multivalent cation is $Al^{3+}$.

13. An inkjet ink comprising an aqueous vehicle and an aqueous pigment dispersion, wherein said pigment dispersion comprising a self-dispersing pigment having at least one type of hydrophilic functional group bonded onto a surface of said self-dispersing pigment, said at least one type of hydrophilic functional group comprising a carboxyl group; and a multivalent cation selected from the group consisting of $Mg^{2+}$, $Ca^{2+}$, $Cu^{2+}$, $Al^{3+}$, $Fe^{3+}$, and mixtures thereof, wherein said multivalent cation is adsorbed onto said self-dispersing pigment via ionic bonds between the multivalent cation and surface acid group on said self-dispersing pigment displacing monovalent cation(s) associating with the carboxyl group on the surface of the self-dispersing pigment, the displaced monovalent cation(s) are removed from the pigment dispersion.

14. The ink of claim 13, wherein said multivalent cation is present at a level of at least 2 ppm.

15. The ink of claim 13, wherein said multivalent cation is $Mg^{2+}$.

16. The ink of claim 13, wherein said multivalent cation is $Cu^{2+}$.

17. The ink of claim 13, wherein said multivalent cation is $Ca^{2+}$.

18. The ink of claim 13, wherein said multivalent cation is $Al^{3+}$.

* * * * *